United States Patent
Zoghlami et al.

(10) Patent No.: US 7,555,046 B2
(45) Date of Patent: Jun. 30, 2009

(54) METHOD AND SYSTEM FOR SEARCHING AND VERIFYING MAGNITUDE CHANGE EVENTS IN VIDEO SURVEILLANCE

(75) Inventors: Imad Zoghlami, Plainsboro, NJ (US); Visvanathan Ramesh, Plainsboro, NJ (US); Nikolaos Paragios, Paris (FR)

(73) Assignee: Siemens Corporate Research, Inc., Princeton, NJ (US)

( * ) Notice: Subject to any disclaimer, the term of this patent is extended or adjusted under 35 U.S.C. 154(b) by 1017 days.

(21) Appl. No.: 11/042,694

(22) Filed: Jan. 25, 2005

(65) Prior Publication Data
US 2005/0180603 A1    Aug. 18, 2005

Related U.S. Application Data

(60) Provisional application No. 60/540,102, filed on Jan. 27, 2004.

(51) Int. Cl.
*H04N 7/12* (2006.01)

(52) U.S. Cl. .............. 375/240.26; 348/143; 348/700
(58) Field of Classification Search ........... 375/240.26; 348/143, 700
See application file for complete search history.

(56) References Cited

U.S. PATENT DOCUMENTS

| 2004/0080615 A1* | 4/2004 | Klein et al. ............. 348/143 |
| 2005/0078222 A1* | 4/2005 | Liu et al. ................ 348/700 |

* cited by examiner

*Primary Examiner*—Y. Lee
*Assistant Examiner*—Richard Torrente (57) ABSTRACT

A method for detecting events in a video sequence includes providing a video sequence, sampling the video sequence at regular intervals to form a series of snapshots of the sequence, measuring a similarity of each snapshot, measuring a similarity change between successive pairs of snapshots, wherein if a similarity change magnitude is greater than a predetermined threshold, a change event has been detected, verifying the change event to exclude a false positive, and completing the processing of the snapshot incorporating the verified change event.

20 Claims, 6 Drawing Sheets

FIG. 1

10: Original video
11: Change detection
12: Selected changes
13: Change verification
14: Selected event
15: Fine processing to extract information
16: Event detected

METHOD AND SYSTEM FOR SEARCHING AND VERIFYING MAGNITUDE CHANGE EVENTS IN VIDEO SURVEILLANCE

CROSS REFERENCE TO RELATED UNITED STATES APPLICATIONS

This application claims priority from "Efficient search of events for video surveillance", U.S. Provisional Application No. 60/540,102 of Imad Zoghlami, et al., filed Jan. 27, 2004, the contents of which are incorporated herein by reference.

TECHNICAL FIELD

The invention is directed to the detection and characterization of events in a long video sequence.

DISCUSSION OF THE RELATED ART

In various applications of machine vision it is important to be able to detect changes and events by interpreting a temporal sequence of digital images. The resulting sequences of imaged changes can then be made available for further scene analysis evaluation by either a person or an intelligent system. A practical system for detecting events must be able to distinguish object motions from other dynamic processes.

Examples of applications of such methods are found in video-based systems for monitoring and control functions, for example in production engineering or in road traffic control and instrumentation (intelligent traffic light control). The determination of spatial structures and the analysis of spatial movements is of the highest significance for applications in robotics, as well as for aims in autonomous navigation. For the purpose of supporting vehicle drivers, there is a need for systems which are capable, with the aid of one or more video cameras and of the vehicle speed determined by the tachometer, and with the aid of other data such as measured distance data, for example, of detecting moving objects in the environment of the vehicle, the spatial structure of the vehicle environment and the intrinsic movement of the vehicle in the environment, and of tracking the movement of detected objects. Finally, in communication technology the reduction of image data for purposes of transmission and storage of image data is steadily gaining in significance. Precisely in the case of coding temporal image sequences, analysis of movements delivers the key to a decisive reduction in datasets or data rates.

Current research has focused on extraction of motion information, and using the motion information for low level applications such as detecting scene changes.

There still is a need to extract features for higher level applications. For example, there is a need to extract features that are indicative of the nature of the activity and unusual events in a video sequence. A video or animation sequence can be perceived as being a slow sequence, a fast paced sequence, an action sequence, and so forth.

Examples of high activity include scenes such as goal scoring in a soccer match, scoring in a basketball game, a high speed car chase. On the other hand, scenes such as news reader shot, an interview scene, or a still shot are perceived as low action shots. A still shot is one where there is little change in the activity frame-to-frame. Video content in general spans the gamut from high to low activity. It would also be useful to be able to identify unusual events in a video related to observed activities. The unusual event could be a sudden increase or decrease in activity, or other temporal variations in activity depending on the application.

SUMMARY OF THE INVENTION

Exemplary embodiments of the invention as described herein generally include methods and systems for efficiently searching for events in a video surveillance sequence. Disclosed herein are methods for detecting object appearance/disappearance in the presence of illumination changes, and in the presence of occlusion either before or after disappearance, and occlusion before or after appearance of an object. The video surveillance sequences can be either indoor or outdoor sequences.

In one aspect of the invention, there is provided a method for detecting events in a video sequence including the steps of providing a video sequence, sampling the video sequence at regular intervals to form a series of snapshots of the sequence, measuring a similarity of each snapshot, measuring a similarity change between successive pairs of snapshots, wherein if a similarity change magnitude is greater than a predetermined threshold, a change event has been detected, verifying the change event to exclude a false positive, and completing the processing of the snapshot incorporating the verified change event. In a further aspect of the invention, the sampling interval is from a few seconds to a few minutes. In a further aspect of the invention, the method comprises defining one or more windows-of-interest in each snapshot, and measuring the similarity in each window-of-interest in each snapshot. In a further aspect of the invention, the similarity measure for a window-of-interest in a snapshot is defined as $$S_w^0(t) = \frac{1}{|W|} \sqrt{\sum_{x \in W} (x_t - \bar{x}_t)(x_t - \bar{x}_t)},$$

where $x_t$ represents the pixel intensity for a pixel in a window-of-interest W of snapshot t, and $\bar{x}_t$ is a spatial intensity average in the window for the snapshot. In a further aspect of the invention, the similarity measure is normalized to the spatial intensity scale of the window-of-interest according to the formula $$S_w(t) = \frac{1}{|W| * \bar{x}_t} \sqrt{\sum_{x \in W} (x_t - \bar{x}_t) * (x_t - \bar{x}_t)}.$$

In a further aspect of the invention, the change in the similarity measure is determined from the time derivative of the similarity measure. In a further aspect of the invention, a false positive includes an occlusion. In a further aspect of the invention, the method comprises eliminating an occlusion by weighting a time derivative of the similarity measure according to the definition $$f_w(t) = g(t) * \dot{S}_w(t) \text{ wherein}$$

$$g(t) = h\left(\min_{i \in [n_1, n_2], j \in [n_1, n_2]} \text{similarity}(w_{t-i}, w_{t+j})\right), \text{ wherein}$$

-continued $$\text{similarity}(w_i, w_j) = \frac{1}{n}\sum_{k=1}^{n} |hist_i[k] - hist_j[k]|,$$

and wherein $\dot{S}_w(t)$ is the similarity measure time derivative, $w_i$, $w_j$ are corresponding windows-of-interest in a pair of successive snapshots, $[n_1,n_2]$ is the duration neighborhood about the snapshot incorporating the occlusion over which similarity is being sought, h is a positive increasing function with $h(1)=1$, and hist is a histogram of spatial intensity values in the window-of-interest. In a further aspect of the invention, $h(x) \propto x^2$. In a further aspect of the invention, a false positive includes a change of illumination. In a further aspect of the invention, the predetermined threshold is based on an analysis of the fluctuations in the similarity change between successive pairs of snapshots. In a further aspect of the invention, the threshold is more than three standard deviations greater than the mean fluctuation magnitude of the similarity change between successive pairs of snapshots.

In another aspect of the invention, there is provided a program storage device readable by a computer, tangibly embodying a program of instructions executable by the computer to perform the method steps for detecting events in a video sequence

DETAILED DESCRIPTION OF THE PREFERRED EMBODIMENTS

Exemplary embodiments of the invention as described herein generally include systems and methods for detecting events in a video surveillance recording. In the interest of clarity, not all features of an actual implementation which are well known to those of skill in the art are described in detail herein.

In order to quickly detect and characterize an event in a long video surveillance recording, one is frequently seeking to detect significant changes in the video images. For example, one purpose of a video surveillance in a parking lot would be to monitor individual parking spaces, to see when an empty space is occupied by a vehicle, or when an occupied space is vacated. The appearance/disappearance of a vehicle represents a significant change in the image recorded in the video surveillance data, and the time scale over which such an event occurs is relatively short when compared to the duration of the recording, i.e., on the order of a minute in a recording that is on the order of one or more hours in duration.

Figure 1:
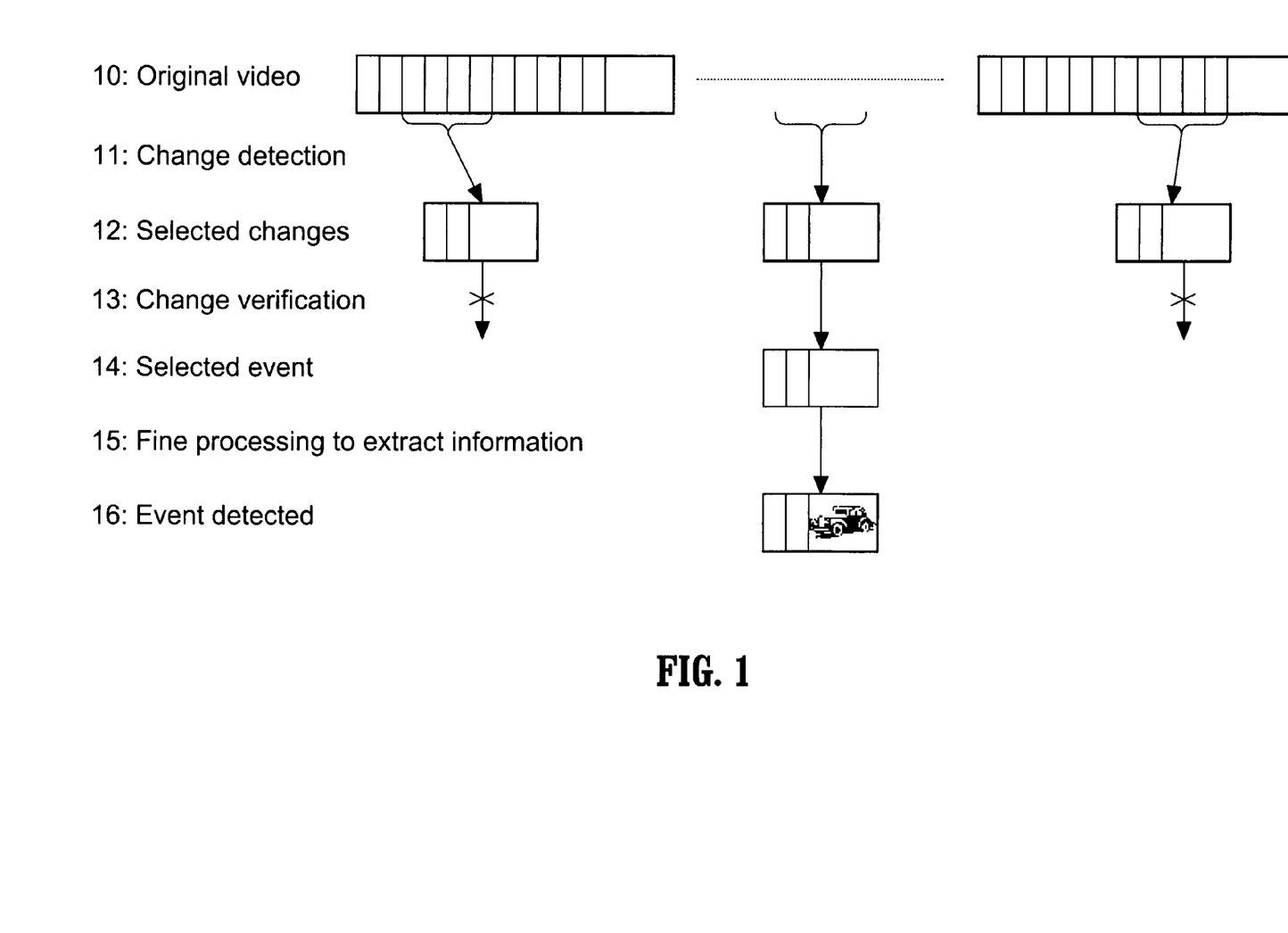
FIG. 1 presents an overview of an event detection method according to one embodiment of the invention.

An overview of an event detection method according to one embodiment of the invention is presented in FIG. 1. Starting with an original video surveillance tape 10 of some duration, the tape is sampled at discrete intervals to form a set of snapshots of the surveillance tape. The original video sequence can be either analog or digital, however, the resulting snapshots are digital images. The sampling interval is chosen sufficiently far apart so that significant events, rather than small changes, are detectable. Upon application 11 of the change detection methods according to an embodiment of the present invention, a subset 12 of the original video that contains change events of interest is selected for further analysis. These selected changes are analyzed 13 using change verification methods according to an embodiment of the present invention, after which one or more events 14 are selected for fine processing to extract information 15. Methods for fine processing of images, such as background modeling, are well known in the art, and can be applied to the selected event to confirm detection 16 of an event.

Figure 2:
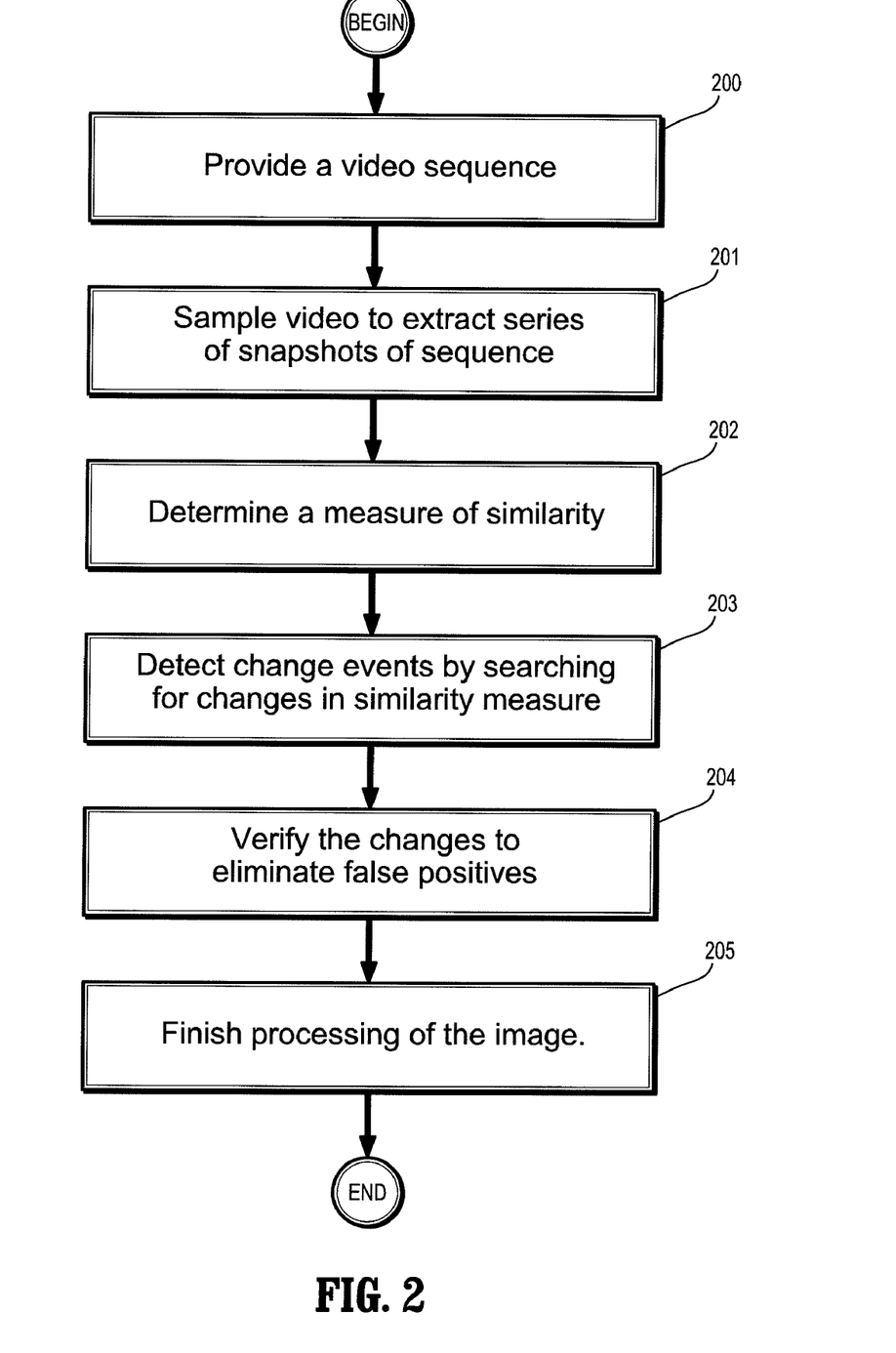
FIG. 2 presents a flow chart of an event detection method according to one embodiment of the invention.

Referring now to the flow chart of FIG. 2, according to an embodiment of the invention, a method for detecting change in a video sequence includes the steps of providing a video sequence for analysis 200, sampling the sequence 201, determining a measure of similarity 202, detecting change 203, and verifying that a change occurred 204. Once the change has been verified, the image processing can be completed 205 according to other methods as needed and as are known in the art. Given the video sequence, a first step 201 of the method is a regular sampling, to create a series of digital images to form snapshots of the video sequence. Within the snapshots are one or more windows-of-interest (WOIs) wherein attention is focused. To help with the detection of significant changes, the sampling removes all smooth changes in the WOIs, like the progressive appearance or disappearance of an object. According to one embodiment of the invention, the sampling interval can be from a few seconds to a few minutes.

A useful measure of similarity in accordance with an embodiment of the invention is determined at step 202 from the image intensity variance within a WOI of a particular snapshot:

$$S_w^0(t) = \frac{1}{|W|}\sqrt{\sum_{x \in W}(x_t - \overline{x}_t)(x_t - \overline{x}_t)},$$

where $x_t$ represents the pixel intensity for a pixel in the window W at time (i.e. snapshot) t, and $\overline{x}_t$ is the spatial intensity average in the window for the snapshot. This variance is invariant to any intensity shift, and can be used for handling both static and moving objects. Note that moving objects are considered only within a WOI. A more robust similarity measure, according to another embodiment of the invention, is a variance normalized to the spatial intensity scale:

$$S_w(t) = \frac{1}{|W|*\overline{x}_t}\sqrt{\sum_{x \in W}(x_t - \overline{x}_t)*(x_t - \overline{x}_t)}.$$

This variance is invariant to any affine intensity scale changes.

Changes are detected across time at step 203 by looking for large changes in the magnitude of the similarity measure between images adjacent in time. More precisely, the time derivative of the similarity measure is computed:

$$\dot{S}_w(t) = \frac{\partial S_w(t)}{\partial t},$$

and large values of this similarity measure time derivative are indicative of an event occurrence between successive snapshots. According to one embodiment of the invention, a threshold is defined so that a derivative magnitude greater than the threshold signifies a potential event of interest, and the corresponding snapshots are selected for further analysis. A suitable threshold can be determined from an analysis of the fluctuations of the similarity measure time derivative. According to one embodiment of the invention, the threshold is defined so that a fluctuation whose magnitude is more than three standard deviations greater than the mean fluctuation magnitude is indicative of a change event of interest. This definition is exemplary and other definitions of a fluctuation threshold are within the scope of the invention.

Figure 3:
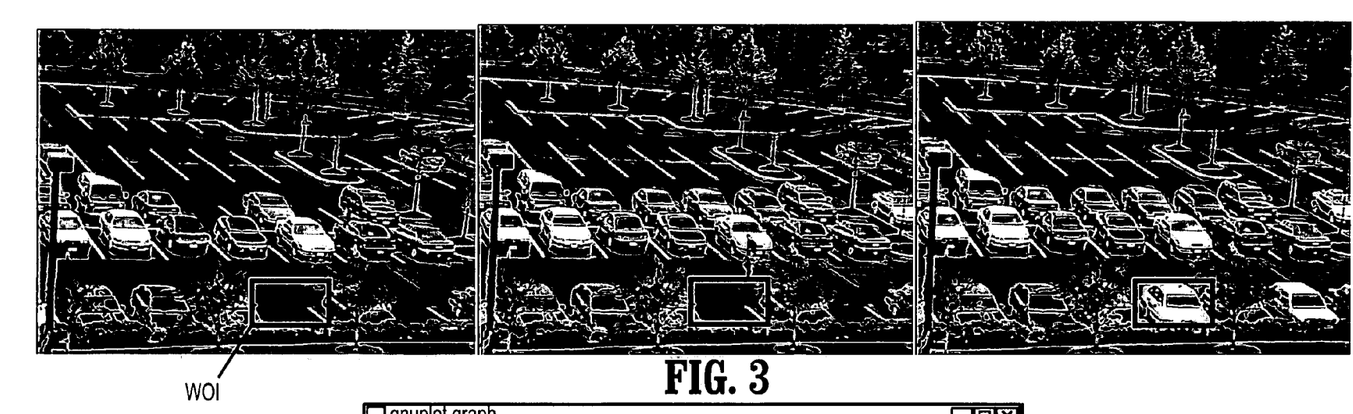
FIG. 3 presents a result of applying a change detection method according to one embodiment of the invention to a video sequence of a parking lot
Figure 4:
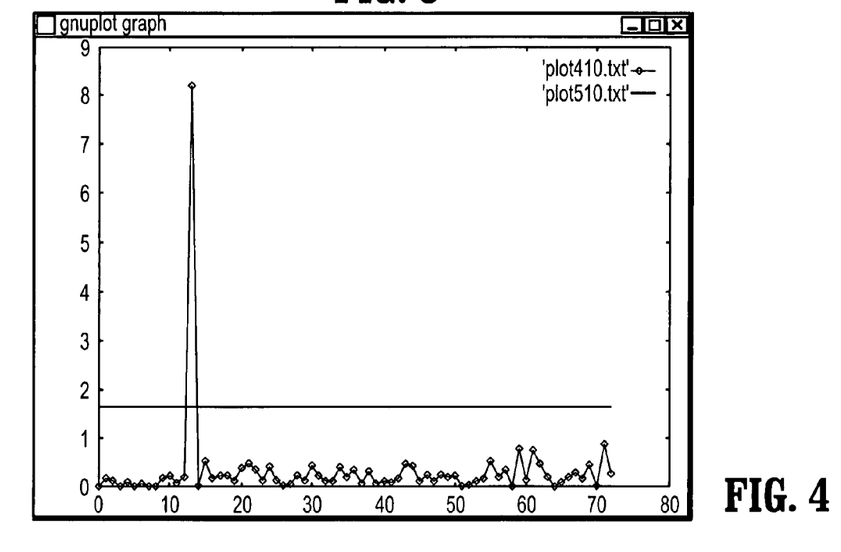
FIG. 4 depicts a graph of the variance time derivative for the video sequence of FIG. 3, along with the threshold.

A result of applying these change detection methods to a video sequence of a parking lot is depicted in FIG. 3. A 72 minute video sequence of a parking lot, with some illumination changes, was sampled at 30 second intervals. The event sought is whether a vehicle parks in a particular space. The left image of FIG. 3 is a snapshot of the beginning of the video sequence, the middle image is the snapshot just before the event, and the right image is the snapshot just after the event. The box outlined in the lower center of the left image is the WOI. As can be seen, this WOI is an empty space, and is still empty in the middle image. The parking space is occupied by a car in the right image. FIG. 4 depicts a graph of the variance time derivative (the fluctuating line with a peak) for this series of snapshots, along with the threshold (the straight line). The variance time derivative exhibits a spike, whose magnitude is well above the threshold, that can be correlated to the appearance of the car in the parking space. The computations involved can be completed within three seconds.

At step 204, the change is verified to exclude false positives. One source of false positives resulting from the change detection methods of the present invention is occlusion, that is, the sudden blocking of the video image due to, for example, a blockage in front of the camera lens. This could result from a person walking through the field of view of the video camera, or even a bird flying in front of the camera lens. Unlike an illumination change, occlusion is likely to change the overall intensity profile of the WOI. To assist in the detection of a change due to occlusion, the window of interest should be similar before and after the occlusion. According to an embodiment of the invention, an interval similarity is computed at each time t and is weighted according to the definition $$f_w(t) = g(t) * \dot{S}_w(t) \text{ where}$$

$$g(t) = h\left(\min_{i \in [n_1, n_2], j \in [n_1, n_2]} \text{similarity}(w_{t-i}, w_{t+j})\right), \text{ and}$$

$$\text{similarity}(w_i, w_j) = \frac{1}{n}\sum_{k=1}^{n} |hist_i[k] - hist_j[k]|.$$

Here, $w_i$, $w_j$ are corresponding WOIs in a pair of successive snapshots, $[n_1, n_2]$ is the duration neighborhood about the snapshot incorporating the occlusion over which similarity is being sought, h is a positive increasing function with $h(1)=1$, and hist is a histogram of spatial intensities in the WOI, where the similarity is computed using a histogram comparison. By duration neighborhood is meant the set of snapshots preceding the occlusion and subsequent to the occlusion. For example, if an occlusion occurred in the $20^{th}$ snapshot (i.e., $t=20$ in the equation for g(t), above), $[n_1, n_2]$ could indicate the $17^{th}$ snapshot through the $22^{rd}$ snapshot (i.e. $n_1=3$, $n_2=2$). Note that any function satisfying the criteria for h can be used, such as an exponential function or a power function. According to one embodiment of the invention, $h(x) \propto x^2$. If the neighborhood used is small, then the time between the compared windows can be made small, on the order of a few minutes. In that case, the change in illumination should be small, and should not have any significant effect on the detection of occlusion. The weighting function thus defined is a penalty function, in that an event due to an occlusion is penalized by having the magnitude of the similarity measure time derivative reduced.

Figure 5:
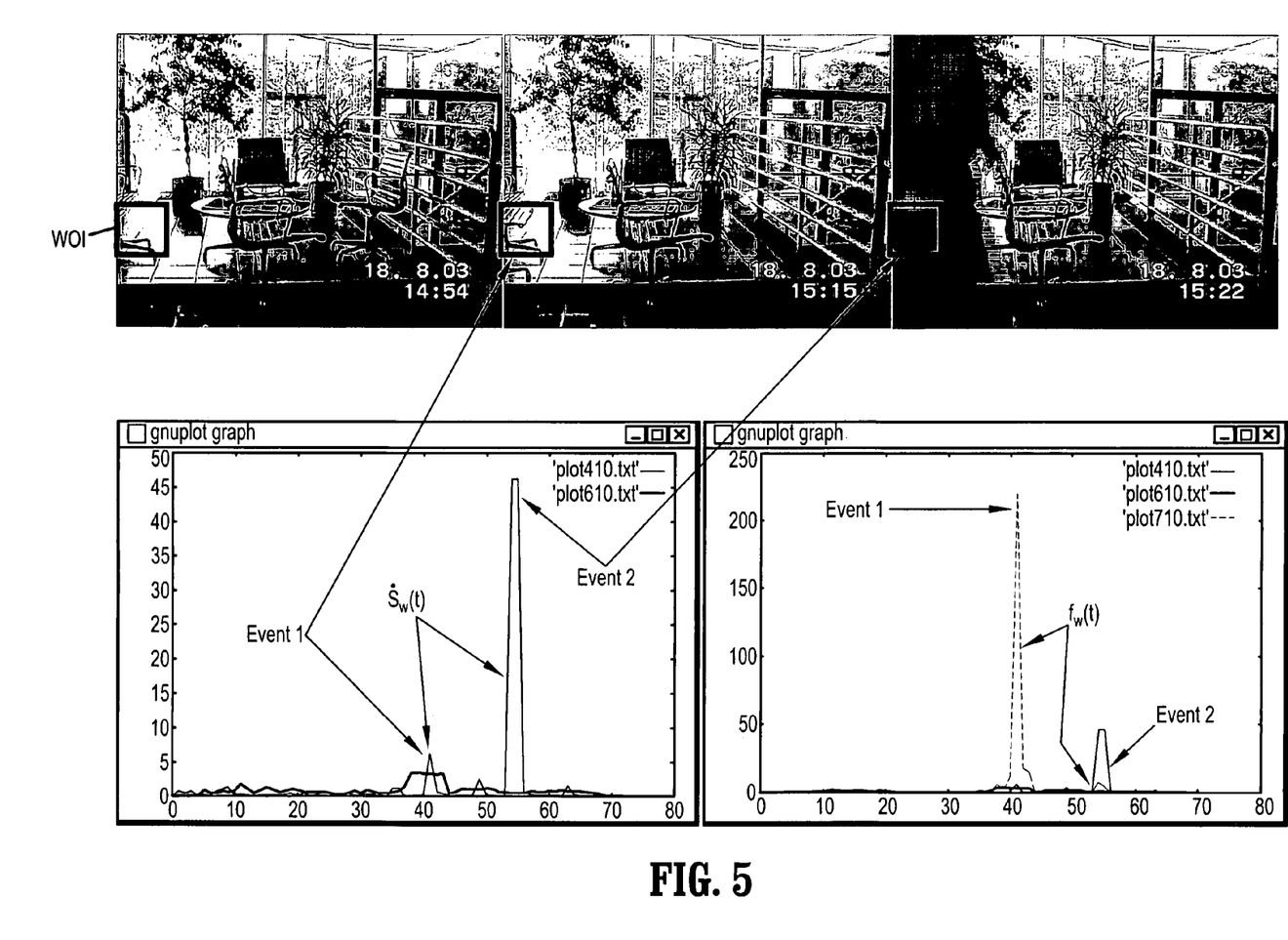
FIG. 5 depicts the result of using an interval similarity weighting to detect occlusion, according to one embodiment of the invention.

FIG. 5 depicts the result of using an interval similarity weighting to detect occlusion. In the top left of FIG. 5 is the first image of a sequence. The top center image of the figure shows the appearance event image (the appearance of a chair), while the top right image of the figure shows the occlusion event image. The WOI is indicated by the box outlined in the lower left of the image. The bottom left of FIG. 5 is a graph of $\dot{S}_w(t)$, where event 1 is the appearance of the chair at time 41 and event 2 at time 55 is the occlusion. Note that the spike in the similarity derivative for the occlusion is much greater in magnitude than that of event 1. The bottom right of FIG. 5 is a graph of $f_w(t) = g(t)*\dot{S}_w(t)$, indicating how the weighting function has magnified the magnitude of the appearance event spike, while reducing that of the occlusion spike. As shown in the figure, the weighted similarity derivative function $f$ removes the occlusion by increasing the spike corresponding to the real appearance at time 41 on the horizontal axis while reducing that of the occlusion.

Another source of false positives is a change of illumination. To verify if a detected event is due to a change of illumination, a method such as that disclosed in United States Patent Application No. 2003/0228058, incorporated herein by reference in its entirety, can be used.

Figure 6:
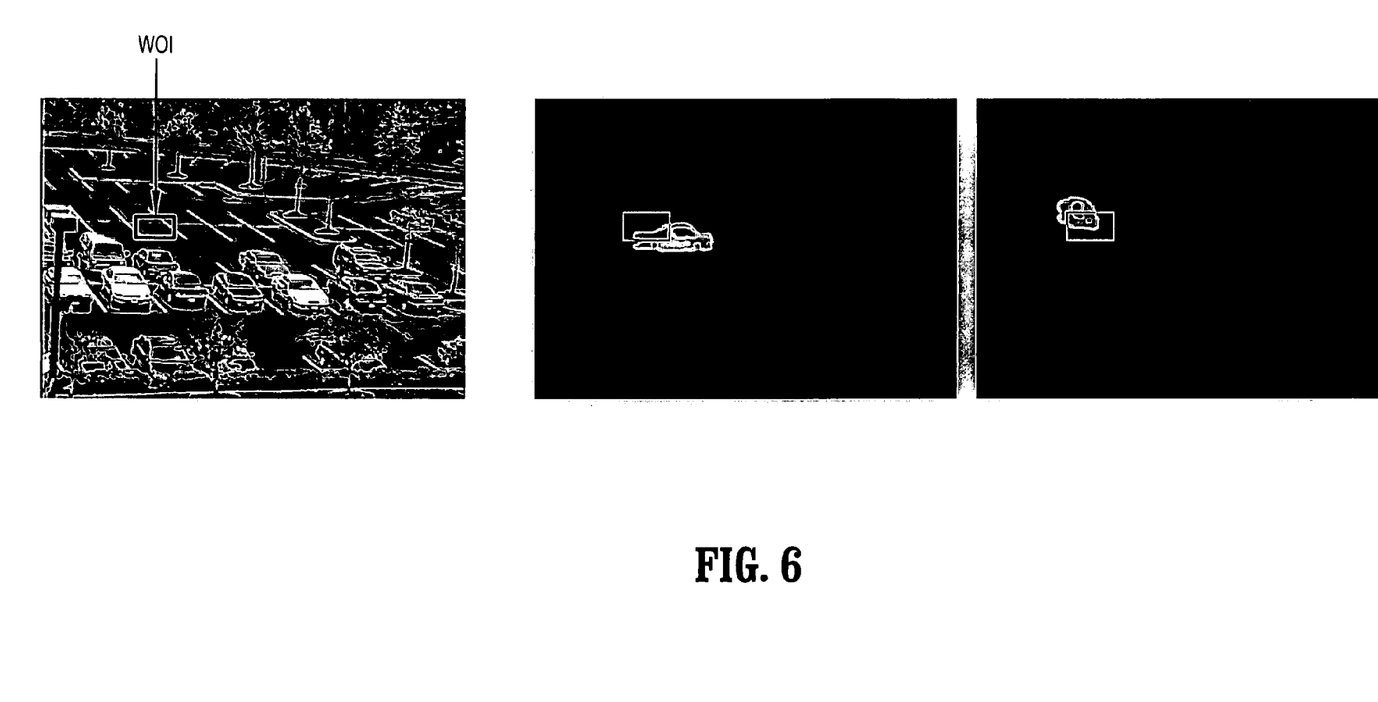
FIG. 6 presents an example of the background modeling results, according to one embodiment of the invention.

Finally, after the event selection, any processing method as is known in the art can be applied at step 205 to complete the processing of the image sequences. For example, a background modeling technique can be used to remove the background and isolate the event of interest. FIG. 6 presents an example of background modeling results, according to an embodiment of the invention. The left image of the figure depicts a parking lot at the beginning of a video sequence, with the WOI denoted by the box outline. The middle image shows the WOI before a change event, with background modeling applied to the image, while the right image shows the WOI after a change event, with background modeling applied to the image. The result is that irrelevant detail is removed from the final image.

System Implementations

It is to be understood that the embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 7:
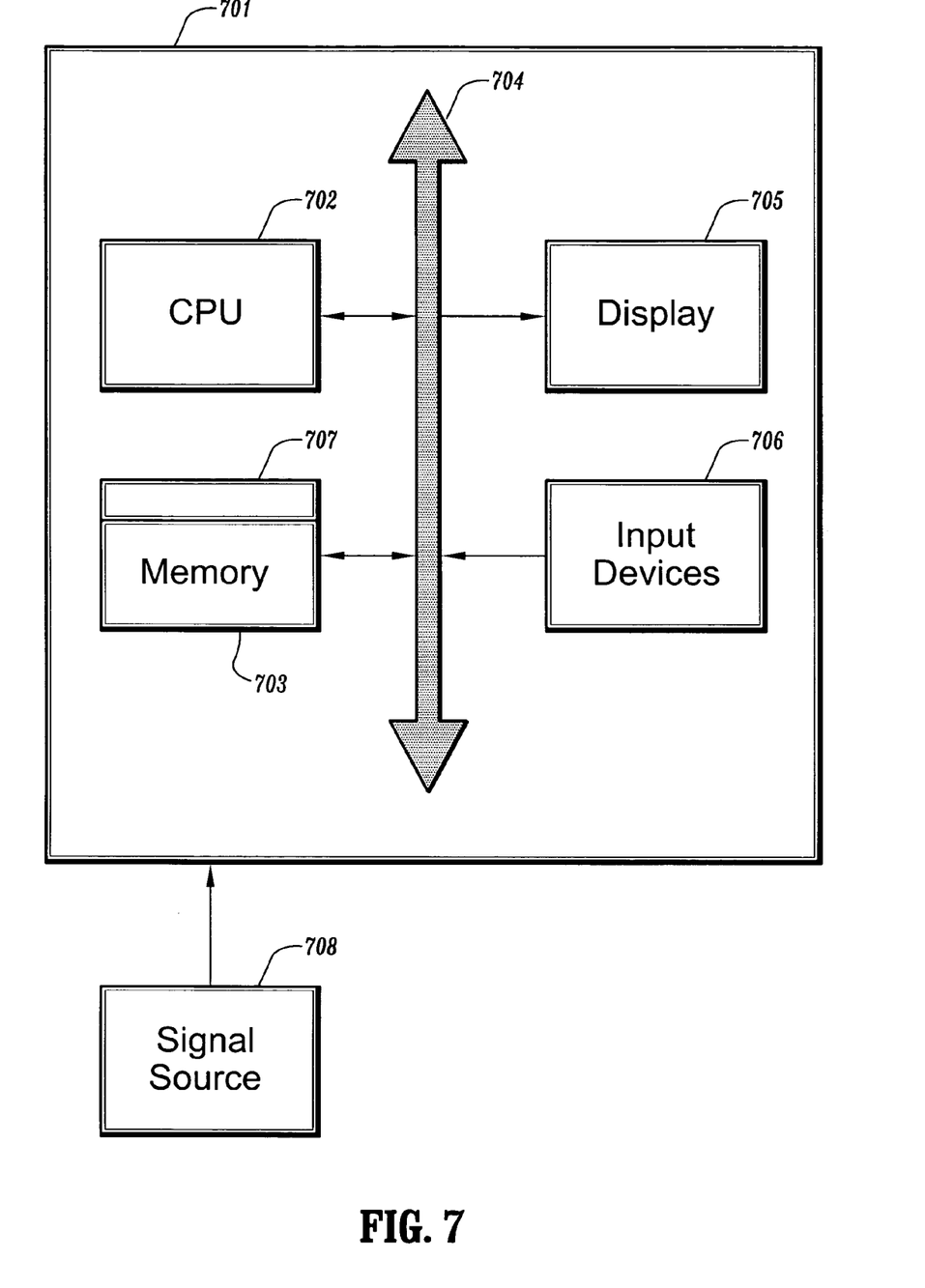
FIG. 7 presents a schematic block diagram of a system that can implement the methods of the invention.

Referring now to FIG. 7, according to an embodiment of the present invention, a computer system 701 for implementing the present invention can comprise, inter alia, a central processing unit (CPU) 702, a memory 703 and an input/output (I/O) interface 704. The computer system 701 is generally coupled through the I/O interface 704 to a display 705 and various input devices 706 such as a mouse and a keyboard. The support circuits can include circuits such as cache, power supplies, clock circuits, and a communication bus. The memory 703 can include random access memory (RAM), read only memory (ROM), disk drive, tape drive, etc., or a combinations thereof. The present invention can be implemented as a routine 707 that is stored in memory 703 and executed by the CPU 702 to process the signal from the signal source 708. As such, the computer system 701 is a general purpose computer system that becomes a specific purpose computer system when executing the routine 707 of the present invention. The computer system 701 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that since the exemplary systems and methods described herein can be implemented in software, the actual method steps may differ depending upon the manner in which the present invention is programmed. Given the teachings herein, one of ordinary skill in the related art will be able to contemplate these and similar implementations or configurations of the present invention. Indeed, while the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

What is claimed is:

1. A method for detecting events in a video sequence, said method comprising the steps of:

providing a video sequence;

sampling the video sequence at regular intervals to form a series of snapshots of the sequence;

measuring a similarity of each snapshot;

measuring a similarity change between successive pairs of snapshots, wherein if a similarity change magnitude is greater than a predetermined threshold, a change event has been detected;

verifying the change event to exclude a false positive, wherein a false positive includes an occlusion;

eliminating an occlusion by weighting a time derivative of the similarity measure according to the definition $$f_w(t) = g(t) * \dot{S}_w(t) \text{ wherein}$$

$$g(t) = h\left(\min_{i \in [n_1, n_2], j \in [n_1, n_2]} \text{similarity}(w_{t-i}, w_{t+j})\right), \text{ wherein}$$

$$\text{similarity}(w_i, w_j) = \frac{1}{n} \sum_{k=1}^{n} |hist_i[k] - hist_j[k]|,$$

and wherein $\dot{S}_w(t)$ is the similarity measure time derivative, $w_i, w_j$ are corresponding windows-of-interest in a pair of successive snapshots, $[n_1, n_2]$ is the duration neighborhood about the snapshot incorporating the occlusion over which similarity is being sought, h is a positive increasing function with $h(1)=1$, and hist is a histogram of spatial intensity values in the window-of-interest; and completing the processing of the snapshot incorporating the verified change event.

2. The method of claim 1, wherein the sampling interval is from a few seconds to a few minutes.

3. The method of claim 1, further comprising defining one or more windows-of-interest in each snapshot, and measuring the similarity in each window-of-interest in each snapshot.

4. The method of claim 3, wherein the similarity measure for a window-of-interest in snapshot is defined as $$S_w^0(t) = \frac{1}{|W|} \sqrt{\sum_{x \in W} (x_t - \bar{x}_t)(x_t - \bar{x}_t)},$$

where $x_t$ represents the pixel intensity for a pixel in a window-of-interest W of snapshot t, and $\bar{x}_t$ is a spatial intensity average in the window for the snapshot.

5. The method of claim 4, wherein the similarity measure is normalized to the spatial intensity scale of the window-of-interest according to the formula $$S_w(t) = \frac{1}{|W| * \bar{x}_t} \sqrt{\sum_{x \in W} (x_t - \bar{x}_t) * (x_t - \bar{x}_t)}.$$

6. The method of claim 1, wherein the change in the similarity measure is determined from the time derivative of the similarity measure.

7. The method of claim 1, wherein $h(x) \propto x^2$.

8. The method of claim 1, wherein a false positive includes a change of illumination.

9. The method of claim 1, wherein the predetermined threshold is based on an analysis of the fluctuations in the similarity change between successive pairs of snapshots.

10. The method of claim 9, wherein the threshold is more than three standard deviations greater than the mean fluctuation magnitude of the similarity change between successive pairs of snapshots.

11. A program storage device readable by a computer, tangibly embodying a program of instructions executable by the computer to perform the method steps for detecting events in a video sequence said method comprising the steps of:

providing a video sequence;

sampling the video sequence at regular intervals to form a series of snapshots of the sequence;

measuring a similarity of each snapshot;

measuring a similarity change between successive pairs of snapshots, wherein if a similarity change magnitude is greater than a predetermined threshold, a change event has been detected;

verifying the change event to exclude a false positive, wherein a false positive includes an occlusion;

eliminating an occlusion by weighting a time derivative of the similarity measure according to the definition $$f_w(t) = g(t) * \dot{S}_w(t)$$

wherein $$g(t) = h\left(\min_{i \in [n_1, n_2], j \in [n_1, n_2]} \text{similarity}(w_{t-i}, w_{t+j})\right),$$

wherein $$\text{similarity}(w_i, w_j) = \frac{1}{n} \sum_{k=1}^{n} |hist_i[k] - hist_j[k]|,$$

and wherein $\dot{S}_w(t)$ is the similarity measure time derivative, $w_i$, $w_j$ are corresponding windows-of-interest in a pair of successive snapshots, $[n_1, n_2]$ is the duration neighborhood about the snapshot incorporating the occlusion over which similarity is being sought, h is a positive increasing function with h(1)=1, and hist is a histogram of spatial intensity values in the window-of-interest; and completing the processing of the snapshot incorporating the verified change event.

12. The computer readable program storage device of claim 11, wherein the sampling interval is from a few seconds to a few minutes.

13. The computer readable program storage device of claim 11, wherein the method further comprises defining one or more windows-of-interest in each snapshot, and measuring the similarity in each window-of-interest in each snapshot.

14. The computer readable program storage device of claim 13, wherein the similarity measure for a window-of-interest in a snapshot is defined as $$S_w^0(t) = \frac{1}{|W|} \sqrt{\sum_{x \in W} (x_t - \bar{x}_t)(x_t - \bar{x}_t)},$$

where $x_t$ represents the pixel intensity for a pixel in a window-of-interest W of snapshot t, and $\bar{x}_t$ is a spatial intensity average in the window for the snapshot.

15. The computer readable program storage device of claim 14, wherein the similarity measure is normalized to the spatial intensity scale of the window-of-interest according to the formula $$S_w(t) = \frac{1}{|W| * \bar{x}_t} \sqrt{\sum_{x \in W} (x_t - \bar{x}_t) * (x_t - \bar{x}_t)}.$$

16. The computer readable program storage device of claim 11, wherein the change in the similarity measure is determined from the time derivative of the similarity measure.

17. The computer readable program storage device of claim 11, wherein $h(x) \propto x^2$.

18. The computer readable program storage device of claim 11, wherein a false positive includes a change of illumination.

19. The computer readable program storage device of claim 11, wherein the predetermined threshold is based on an analysis of the fluctuations in the similarity change between successive pairs of snapshots.

20. The computer readable program storage device of claim 19, wherein the threshold is more than three standard deviations greater than the mean fluctuation magnitude of the similarity change between successive pairs of snapshots.

* * * * *